United States Patent
Saward et al.

(10) Patent No.: US 7,156,593 B1
(45) Date of Patent: Jan. 2, 2007

(54) ADJUSTABLE TIE DOWN MECHANISM FOR ROOF RACK AND INTERIOR RAIL SYSTEMS

(75) Inventors: Ronald G. Saward, Shelby Township, MI (US); John H. Harberts, Macomb, MI (US); John Edward Klinkman, Riley Township, MI (US)

(73) Assignee: Sportrack, LLC, Sterling Heights, MI (US)

( * ) Notice: Subject to any disclaimer, the term of this patent is extended or adjusted under 35 U.S.C. 154(b) by 0 days.

(21) Appl. No.: 11/101,984

(22) Filed: Apr. 8, 2005

Related U.S. Application Data

(63) Continuation-in-part of application No. 10/825,456, filed on Apr. 15, 2004.

(60) Provisional application No. 60/463,291, filed on Apr. 16, 2003.

(51) Int. Cl.
*B61D 45/00* (2006.01)

(52) U.S. Cl. .................................. 410/104

(58) Field of Classification Search ............... 410/104, 410/101, 102, 106, 107, 110, 115, 116; 24/265 CD, 24/115 K; 248/499
See application file for complete search history.

(56) References Cited

U.S. PATENT DOCUMENTS

| | | | | |
|---|---|---|---|---|
| 3,643,973 | A * | 2/1972 | Bott | 410/101 |
| 6,585,465 | B1 * | 7/2003 | Hammond et al. | 410/104 |
| 6,644,901 | B1 * | 11/2003 | Breckel | 410/104 |
| 6,827,531 | B1 * | 12/2004 | Womack et al. | 410/104 |
| 6,846,140 | B1 * | 1/2005 | Anderson et al. | 410/104 |

* cited by examiner

*Primary Examiner*—H Gutman
(74) *Attorney, Agent, or Firm*—Rader, Fishman & Grauer PLLC

(57) ABSTRACT

An adjustable tie-down assembly includes a pin having a first end and a second end. A lock plate is disposed proximate the second end and a sliding block is partially received within an opening of a rail. The block is adapted to receive the pin. A tie-down loop is disposed proximate the first end and at least one spring member is disposed proximate the sliding block. The spring member is adapted to bias the tie-down loop in a first direction away from the sliding block and the spring member is adapted to secure the lock plate to the rail.

19 Claims, 14 Drawing Sheets

ADJUSTABLE TIE DOWN MECHANISM FOR ROOF RACK AND INTERIOR RAIL SYSTEMS

CROSS-REFERENCE TO RELATED APPLICATIONS

The present continuation-in-part application claims priority from the utility patent application (Ser. No. 10/825,456) filed on Apr. 15, 2004, and the U.S. provisional application (Ser. No. 60/463,291) filed Apr. 16, 2003, the entire contents of which are herein incorporated by reference.

FIELD OF THE INVENTION

The present invention relates to a tie-down system, and in particular to an adjustable tie-down mechanism for a vehicle's roof rack or interior rail system having a simplified structure that can be easily installed, positioned, or removed without the need for tools.

BACKGROUND

With the growing popularity of sport utility vehicles (SUVs), minivans, station wagons, and trucks, the need for a tie-down system as an internal or external application has also grown in popularity. The most common type of tie-down system used in the automotive field for roof racks or article carriers includes a thumb-wheel mechanism to secure a tie-down assembly in position. In the thumb-wheel mechanism, the strength of the clamping force to secure the tie-down assembly holds the tie-down assembly from sliding along a rail during loading.

Tie-down systems are commonly used with elongated rails forming a pair of generally parallel side walls extending from a bottom surface defined therebetween. Inwardly extending flanges disposed above the bottom surface extend from an outer edge of each side wall Together, the bottom surface, side walls and flanges define a channel. The tie-down system is disposed along a rail with a portion of the tie-down system including a lock plate being received within the channel, and movement selectively constrained through interaction of the tie-down system with at least a subset of the side walls, bottom surface, and flanges.

However, in the thumb-wheel system, the strength of the clamping force to secure the tie-down assembly in position depends on the strength of the user. In addition, the typical thumb wheel system is a complex mechanism that is difficult to remove once the tie-down assembly is locked into position.

An adjustable tie-down mechanism according to the embodiments described herein can be easily relocated along the rail or removed without the need for tools. In addition, a tie-down mechanism according to the embodiments described herein is of a simple construction yet positively secures the lock plate to the rail independently of the strength of the user.

BRIEF SUMMARY

The present invention includes an adjustable tie-down mechanism made up of a rail and a tie-down assembly. The rail is in the basic shape of a "C" channel. Slots or in the alternative, detents, are located in the channel to allow the tie-down assembly to be inserted into a prescribed location. The tie-down assembly includes several components: a lock plate, a tie-down assembly loop, a sliding block, and a pin for fastening the lock plate to the tie-down assembly loop. The lock plate is used to secure the tie-down assembly to the rail. The tie-down loop is inserted into the sliding block with at least one compressed spring disposed between the sliding block base and tie-down loop. It is contemplated by this invention that the spring may be disposed around the pin or proximate the pin. The spring provides a biasing force so that the lock plate positively secures the tie-down assembly to the rail. By pressing the tie-down loop in a direction opposite to the biasing force of the spring, the lock plate can be released so that the tie-down assembly can be slid to another detent position on the rail. In one embodiment of the invention, pressing the tie-down loop and turning it approximately ninety (90) degrees releases the tie-down loop from the rail. The tie-down assembly can then be easily removed from the rail.

Various aspects and advantages of this invention will become apparent to those skilled in the art from the following detailed description of the embodiments described herein, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION

FIGS. 1 to 19 illustrate one embodiment of an adjustable tie-down mechanism, shown generally at 10, described herein. The tie-down mechanism 10 includes a rail, shown generally at 20, and a tie-down assembly, shown generally at 30. The rail 20 is one form of a securing member and other means for securing the tie-down mechanism 10 are contemplated by the embodiments described herein.

Figure 2:
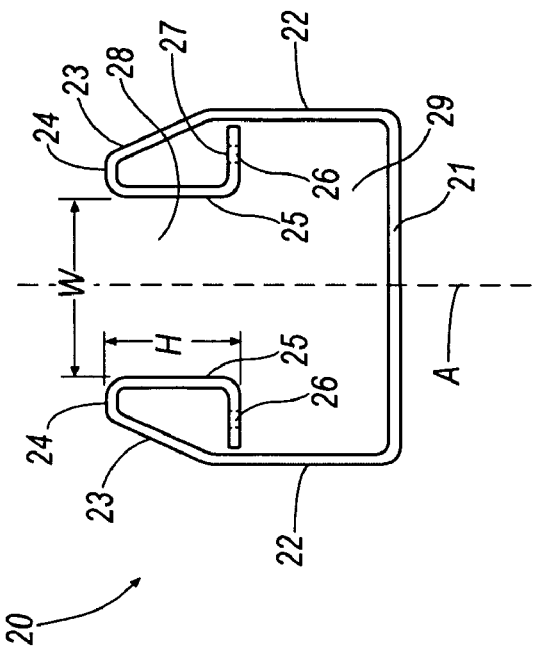
FIG. 2 is an enlarged end elevational view of a rail of the mechanism of FIG. 1.
Figure 1:
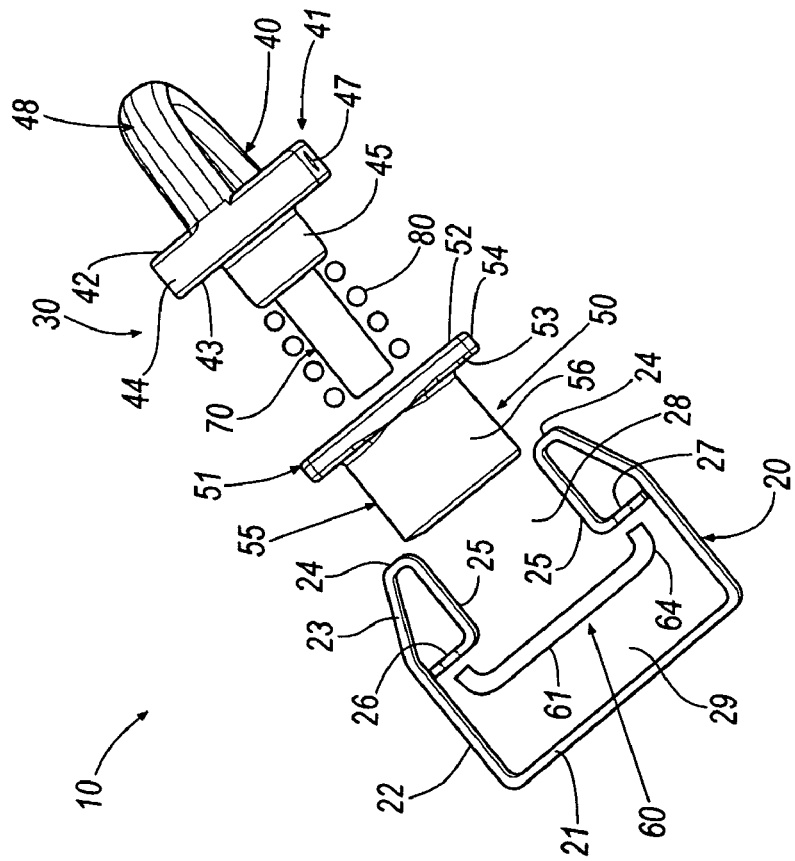
FIG. 1 is an exploded end elevational view of an adjustable tie-down mechanism according to a first embodiment of the invention.
Figure 3:
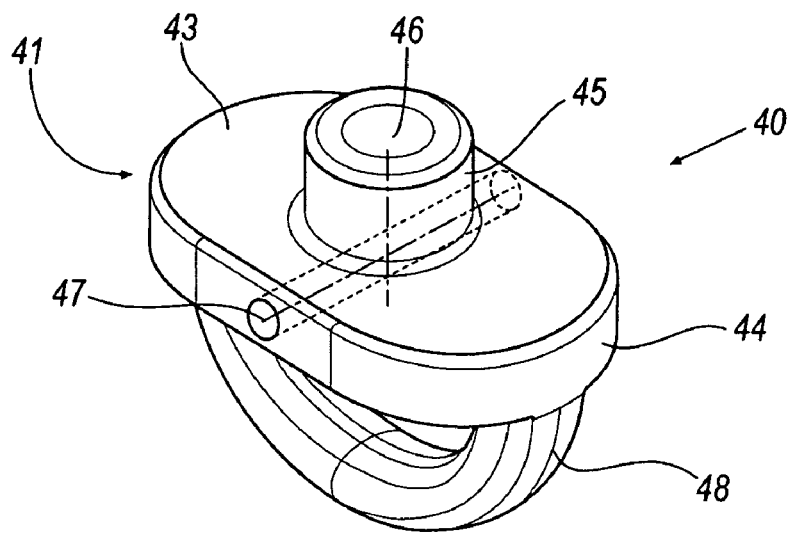
FIG. 3 is an enlarged inverted view perspective view of the tie-down loop of the mechanism of FIG. 1.
Figure 4:
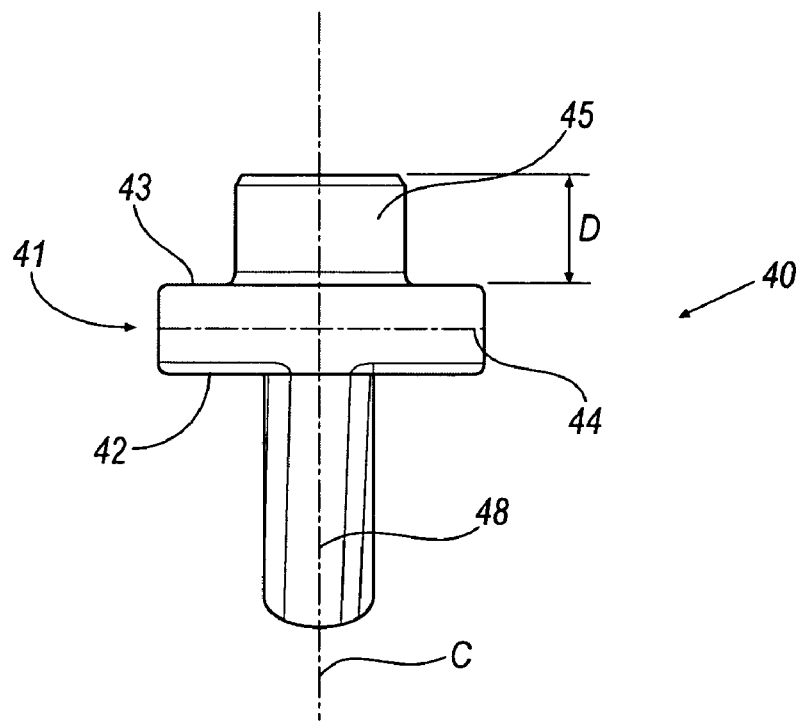
FIG. 4 is an end elevational view of the tie-down loop of FIG. 3.
Figure 5:
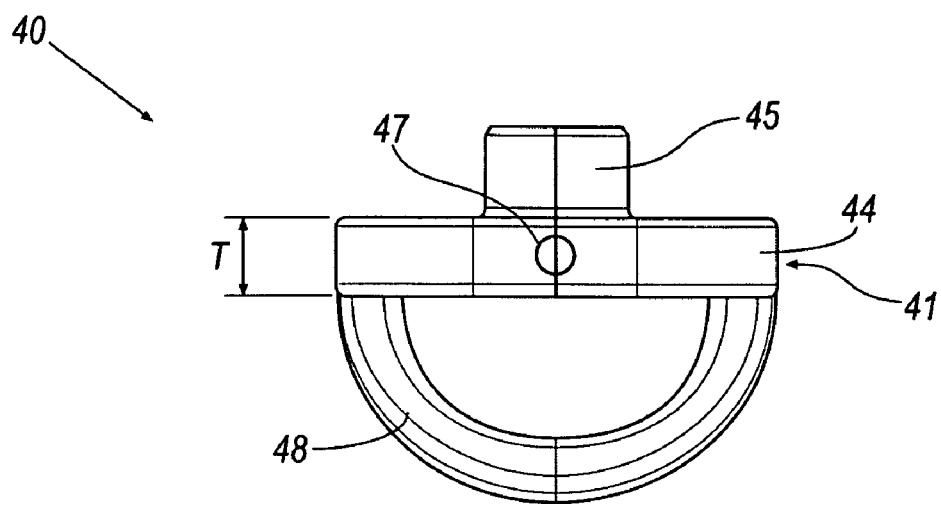
FIG. 5 is a side elevational view of the tie-down loop of FIG. 3.
Figure 6:
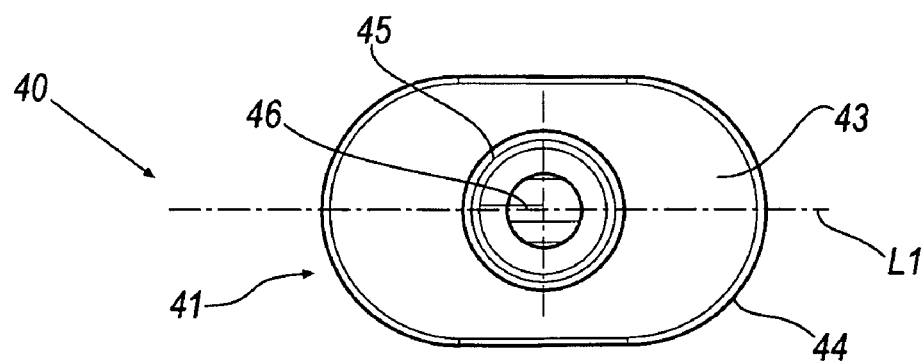
FIG. 6 is a bottom plan view of the tie-down loop of FIG. 3.
Figure 7:
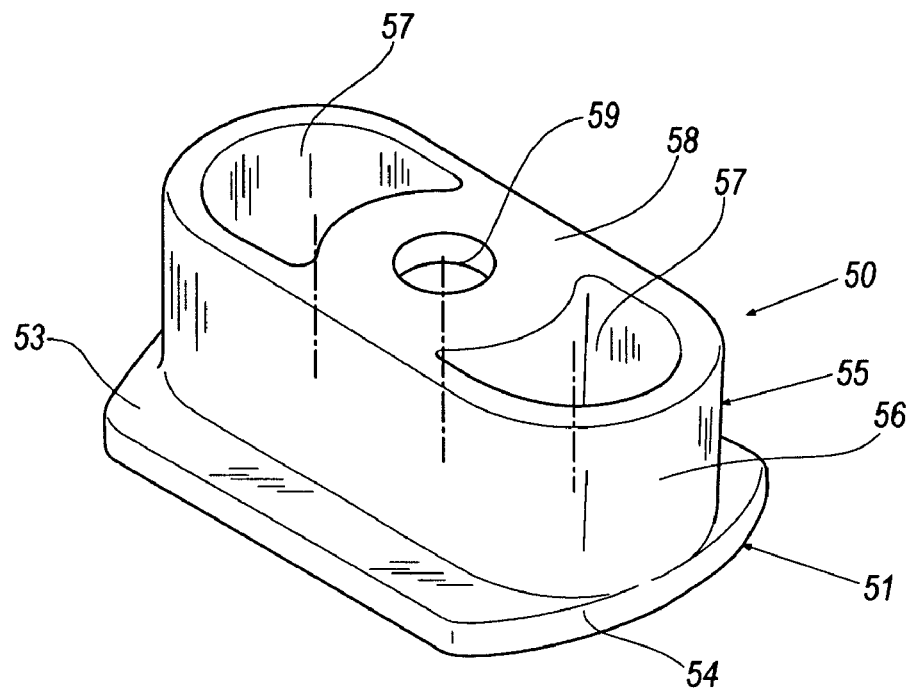
FIG. 7 is a perspective view of a sliding block of the mechanism of FIG. 1.
Figure 8:
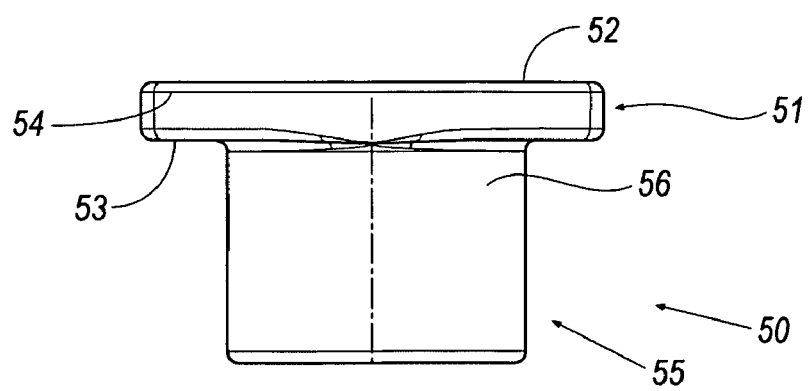
FIG. 8 is an end elevational view of the sliding block of FIG. 7.
Figure 9:
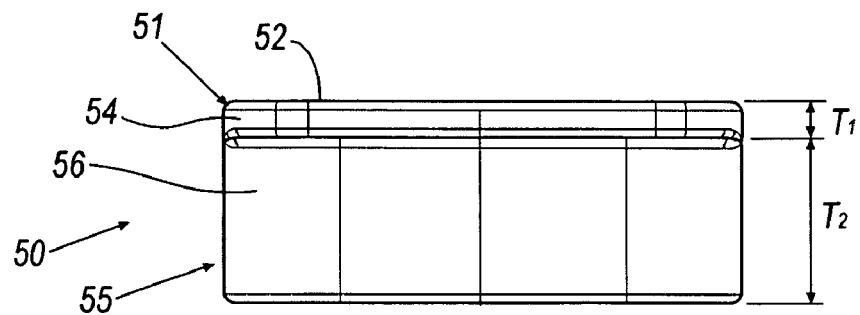
FIG. 9 is a side elevational view of the sliding block of FIG. 7.
Figure 10:
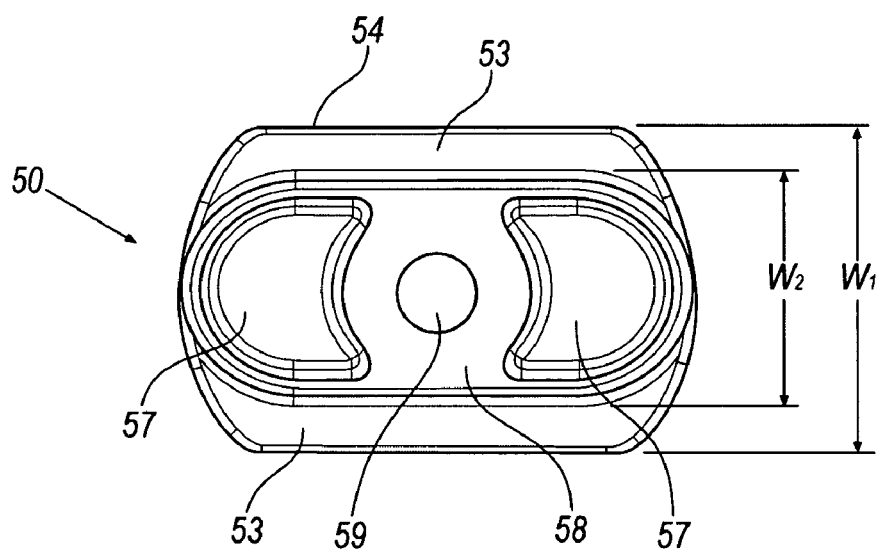
FIG. 10 is a bottom plan view of the sliding block of FIG. 7.
Figure 11:
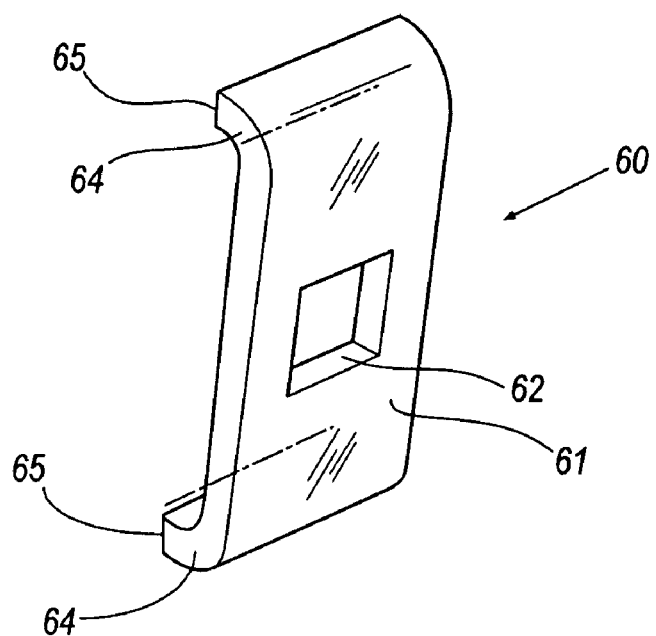
FIG. 11 is a perspective view of a lock plate of the mechanism of FIG. 1.
Figure 12:
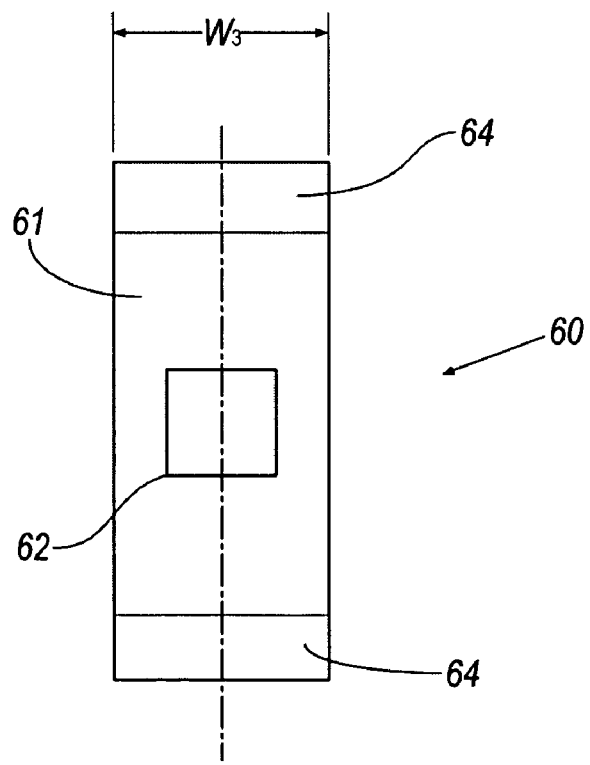
FIG. 12 is a bottom plan view of the lock plate of FIG. 11.
Figure 13:
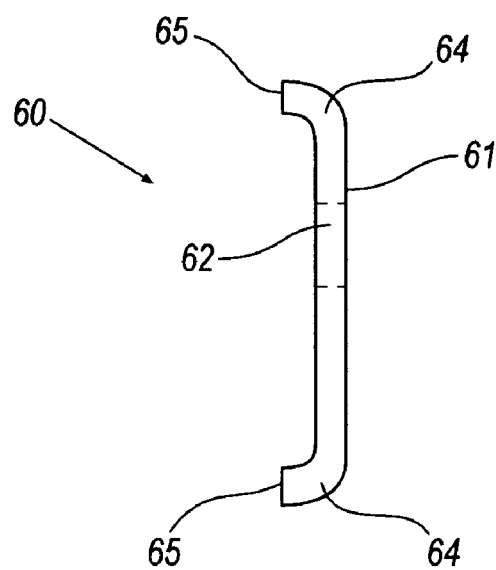
FIG. 13 is a side elevational view of the lock plate of FIG. 11.
Figure 14:
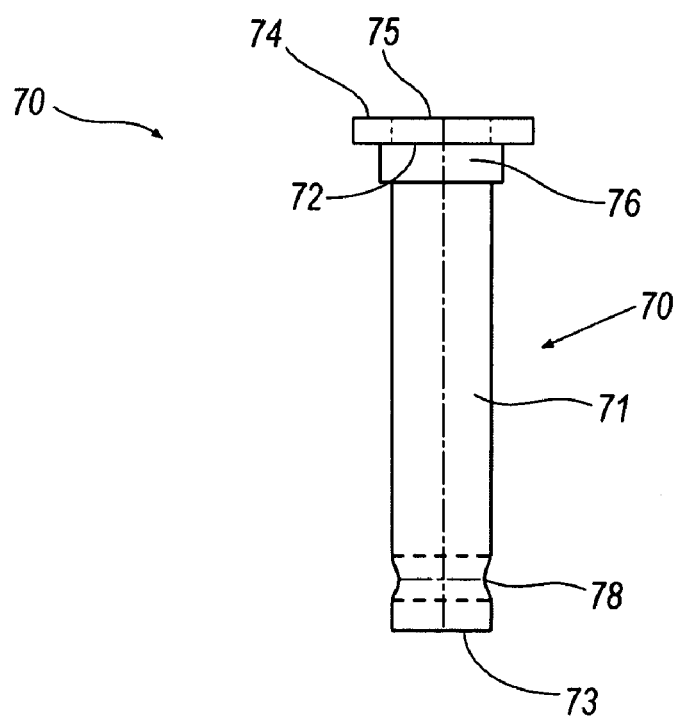
FIG. 14 is a side elevational view of a pin of the mechanism of FIG. 1.
Figure 15:
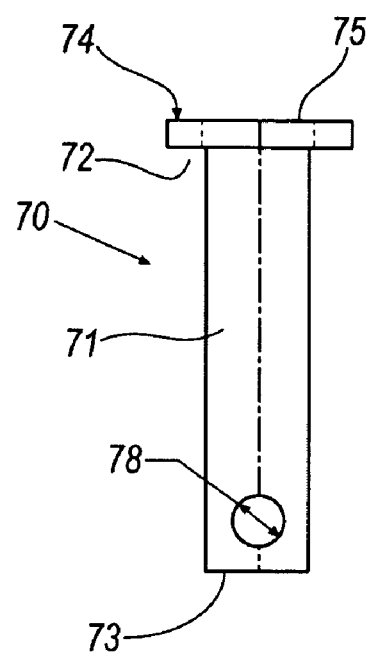
FIG. 15 is another side view of the pin of FIG. 14 rotated approximately ninety (90) degrees from the view of FIG. 14.
Figure 16:
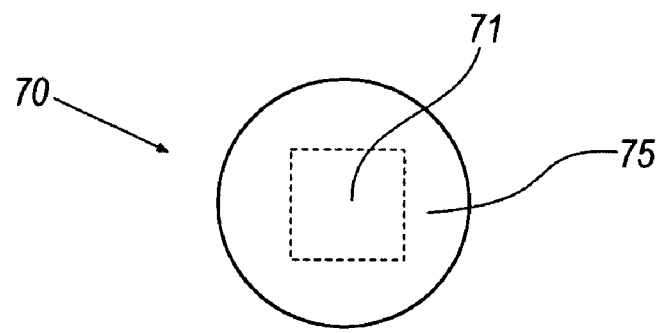
FIG. 16 is a bottom plan view of the pin of FIG. 14.

As seen in FIGS. 1 and 2, the rail 20 includes a generally planar base 21 for mounting the rail 20 to a structure, such as a vehicle, by any suitable means such as through the use of a bolt passing through an aperture formed through base 21 for securement to the structure (not shown). Each of a pair of outer side walls 22 extends generally perpendicularly from the base 21. Thus, the outer side walls 22 are substantially parallel to each other, so that the rail has a "C" cross-sectional shape, as best shown in FIG. 2.

Each of a pair of outer side walls 22 includes an angled portion 23, each of which extends toward the other and eventually terminates at a top surface 24 of the rail 20. A pair of inner side walls 25 extends downwardly from the top surfaces 24 toward the interior of the rail 20. The inner side walls 25 are generally parallel to each other and, therefore, are generally parallel to each of the pair of outer side walls 22. The inner side walls 25 are separated from each other to form an opening 28 having a width W and a height H. The width W and the height H of the opening 28 are discussed in greater detail below.

Figure 19:
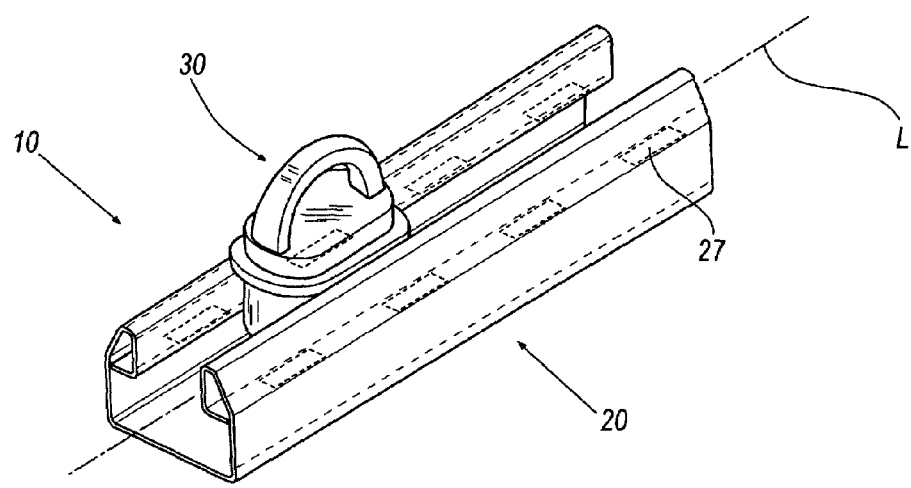
FIG. 19 is a perspective view of the mechanism of FIG. 1.

The rail 20 also includes a pair of flanges 26 extending outwardly from a terminating lower edge of the inner side walls 25 so that the flanges 26 are generally parallel to the base 21. The flanges 26 and the base 21 form a channel 29 therebetween. Each flange 26 includes one or more slots 27 at predetermined intervals along the length of the rail 20. The slots 27 are shown in FIG. 19 and are discussed in greater detail below. Preferably, the rail 20 is generally symmetric about a vertical axis, A, that is generally transverse to the longitudinal dimension of the rail 20. The rail 20 is preferably formed from steel, plastic, aluminum, polyamide resin, or the like and as illustrated, is formed as a single integral component and can be formed by extrusion, roll form, stamping, or similar operation.

Referring now to FIGS. 1 and 3–6, the tie-down assembly 30 generally includes an attachment member or tie-down loop, shown generally at 40, a sliding block, shown generally at 50, a lock plate, shown generally at 60, a pin, shown generally at 70, and a spring 80 disposed around the pin 70 and between the tie-down loop 40 and the sliding block 50. It is contemplated that within the scope of the embodiment described herein, the spring 80 may be disposed within the sliding block 50.

The tie-down loop 40 includes a base member, shown generally at 41, having a thickness T, an upper surface 42, a lower surface 43 and a lateral surface 44. An annular guide member 45 extends outward a distance D from the lower surface 43. The annular guide member 45 is preferably centrally disposed on the lower surface 43. The purpose of the annular guide member 45 is explained in greater detail below. The tie-down loop 40 defines an opening 46 passing through the annular guide member 45 and the upper surface 42 and an opening 47 passing through at least portions of lateral surfaces 44. The opening 46 is preferably centrally disposed within the annular guide member 45. The tie-down loop 40 also includes a generally semi-circular loop member 48 extending from the upper surface 42 for fastening a load to the adjustable tie-down mechanism 10. It is contemplated by this invention that loop member 48 may be formed in various other shapes including ones that are generally triangular and rectangular. The key is for the loop member 48 to be able to receive a hook or the like of an appropriate fastener such as a strap. Preferably, the loop member 48 is located along an axis C of the tie-down loop 40. The tie-down loop 40 is preferably formed from zinc die-cast, polyamide resin, plastic, aluminum, steel, or the like and can be formed by stamping, molding, or similar operation.

Referring now to FIGS. 1 and 7–10, the sliding block 50 includes a base, shown generally at 51, having a thickness T1, a top surface 52, a bottom surface 53, and a side surface 54. The thickness T1 can be of any magnitude sufficient thickness to provide adequate structural support for the sliding block 50. Preferably, the base 51 is generally elliptical in shape and has a width W1. However, the base 51 can be any aesthetically desirable shape providing adequate structural support for the sliding block 50 on the top surfaces 24 of the rail 20. Preferably the width W1 of the base 51 is greater than the width W of the rail 20 to help facilitate contact with the top surfaces 24 of the rail 20.

The sliding block 50 also includes a sliding block member formed integrally with the base 51 and shown generally at 55. For aesthetic reasons, the sliding block member 55 is preferably complementary in shape to the base 51. For example, the sliding block member 55 may be generally elliptical in shape and has a width W2 that is slightly smaller than the width W of the rail 20. The smaller width W2 allows the sliding block member 55 to be inserted within the opening 28 of the rail 20 until the bottom surface 53 of the base 51 engages the top surface 24 of the rail 20. In addition, the sliding block member 55 includes outer walls 56 preferably having a thickness T2, which is generally equal to the height H of the opening 28 of the rail 20. Outer walls 56 are lateral in order to provide proper engagement with the inner side walls 25 of the rail 20 so that the overall block member 55 doesn't twist when subjected to twisting loads or accidentally pops out when subjected to strong lateral loads. As a result, the area between the outer walls 56 of the block member 55 and inner walls 25 of the rail 20 is maximized. The area between the outer walls 56 and the inner walls 25, however, is not so tight that movement along rail 20 is impeded. The sliding block member 55 includes a pair of cavities 57 and a central portion 58 formed with an opening 59. Preferably, the opening 59 is centrally disposed in the central portion 58 and passes through the sliding block member 55 and the base 51. The sliding block 50 is preferably formed from a polyamide resin, aluminum, steel, plastic, or the like and can be formed by stamping, molding, or similar operation.

Referring now to FIGS. 1 and 11–13, a lock plate 60 is shown providing securement of the tie-down mechanism 10 against the rail 20. The lock plate 60 includes a generally planar central portion 61 forming an opening 62 that is preferably centrally disposed in the central portion 61. The opening 62 also provides an anti-rotation feature described in greater detail below. The lock plate 60 includes a pair of rounded outer end portions 64 that terminate at respective outer edge 65. The lock plate 60 further forms an opening 62 passing transversely through the lock plate 60. The opening 62 is shown to be generally square-like but may include any shape. Preferably, the central portion 61, the rounded portions 64, and the end portions 65 are of uniform width W3, which is narrower than the width W of the rail 20 so that the lock plate 60 can pass through the opening 28 of the rail 20. Further, the width W3 is slightly narrower than the width of the slots 27 of the rail 20, so that the end portions 65 can be selectively received within the slots 27. The slots 27 extend the longitudinal length of the rail 20 at symmetrically spaced discrete locations having slots with a longitudinal length adapted to receive the lock plate 60 of width W3. The lock plate 60 is preferably formed from steel, aluminum, polyamide resin, plastic, or the like, and can be formed by stamping, molding, or similar operation.

Referring now to FIGS. 1 and 14–16, the pin 70 includes a generally cylindrical shank portion 71 having a pair of opposing ends 72, 73. At one end 72, the pin 70 includes a generally circular central portion 75 having a generally planar top surface, shown generally at 74, a generally square feature 76 that is adapted to engage the lockplate 60. The square feature 76 preferably has an outer dimension slightly smaller than the dimension of the opening 62 in the lock plate 60 so that the square feature 76 may be received in the opening 62. In this manner the central portion 75, including the square feature 76 in combination with opening 62 form the anti-rotation feature of the invention. The generally square feature 76 may be attached to the pin 70 during assembly, as described below. It is contemplated by the embodiments described herein that the lock plate 60 and the pin 70 may be connected together by welding or the like.

In one illustrated embodiment, the central portion 75 of the pin 70 has a diameter slightly larger than the diameter of the shank portion 71, but is slightly less than the diameter of the opening 46 of the tie-down loop 40, the opening 59 of the sliding block 50, and the opening 62 of the lock plate 60. The central portion 75 may also have a shape complementary with a corresponding pocket (not shown) defined by tie-down loop 40 such that it engages the pocket and is locked against rotation by the pocket. The shape may be circular as shown but may include any polygon cross-section. The pin 70 preferably has a length L so that it can be inserted through the tie-down loop 40, the sliding block 50 and the lock plate 60 until the end 73 engages the tie-down loop 40. The pin 70 also defines an opening 78 passing through the shank portion 71 proximate to the end 73 so that the opening 78 is capable of alignment with the opening 47 of the tie-down loop 40. The pin 70 may be a separate component formed from steel, aluminum, plastic, polyamide resin, or the like and can be formed by stamping, molding, or similar operation. Alternatively, the pin 70 may be integrally formed with the tie-down loop 40 further preventing rotation between the tie-down loop 40 and the pin 70 by enhancing the attachment between the two elements. It is also contemplated by an alternative embodiment that the pin 70 is threaded allowing the user to further tighten the lock plate 60 against the rail 20 or into the one or more slots 27 similar to the illustrated alternative embodiment in FIG. 24. This alternative embodiment contemplates that either the lock plate 60 is threaded or the tie-down loop 40 is threaded to allow the further tightening of lock plate 60. When lock plate 60 is threaded, then it will move up and down the pin 70 when the tie-down loop 40 is turned in a tightening direction. When the tie-down loop 40 is threaded, then it will move up and down the pin 70 to allow the further tightening of the lock plate 60. Other contemplated embodiments are further discussed below.

Referring now to FIGS. 1, 3, 10, and 15, the adjustable tie-down mechanism 10 is assembled by inserting the pin 70 into the opening 46 of the tie-down loop 40 and aligning the opening 78 of the pin 70 with the opening 47 of the tie-down loop 40. The pin 70 can be fastened to the tie-down loop 40 by using any well-known means in the art, such as a screw, welding, gluing, and the like. Alternatively, as discussed above, the pin 70 can be integrally formed with the tie-down loop 40 and made of similar materials. Next, the spring 80 is disposed around the outer circumference of pin 70. Then, the pin 70 and spring 80 are inserted into the opening 59 of the central portion 58 of the sliding block 50. Because the opening 59 of the sliding block 50 has a diameter slightly larger than the pin 70, but slightly smaller than the spring 80, only the pin 70 passes through the opening 59 while the spring 80 is retained within the central portion 58 of the sliding block 50.

Next, the pin 70 is inserted through the opening 62 of the lock plate 60 and the spring 80 is compressed within the central portion 58 of the sliding block 50 until a small portion of the pin 70 extends outwardly from the lock plate 60. Then, the top surface 74 with the square feature 76 is received within the opening 62 of the lock plate 60 to form the anti-rotation feature of the embodiment in FIG. 1. The central portion 75, however, may be attached to the lock plate 60 at any time prior to the assembly of the tie-down mechanism 10. The anti-rotation feature prevents the lock plate 60 from rotating relative to the tie-down loop 40 because the pin 70 is connected to both the tie-down loop 40 and the lock plate 60. Thus, the tie-down loop 40 and the lock plate 60 generally move simultaneously so that rotation of the tie-down loop 40 causes rotation of the lock plate 60. It should be noted that when assembled, the longitudinal axis L1 of the tie-down loop 40 is generally perpendicular to the longitudinal axis L2 of the lock plate 60, as shown in FIG. 1. Thus, when the longitudinal axis L1 of the tie-down loop 40 is parallel to the longitudinal axis L of the rail 20, the longitudinal axis L2 of the lock plate 60 is generally perpendicular to the longitudinal axis L of the rail 20, and vice versa. At this point, the assembly of the adjustable tie-down mechanism 10 of the embodiment is complete.

Figure 17:
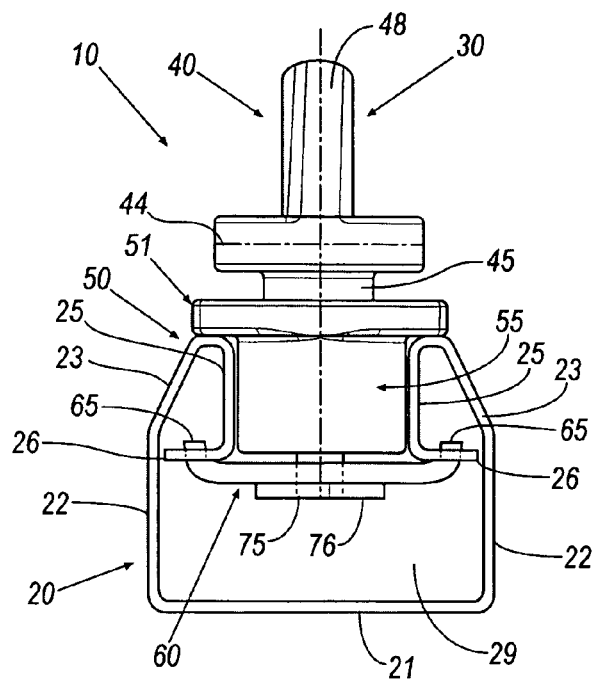
FIG. 17 is an end elevational view of the mechanism of FIG. 1 in a locked position.
Figures 18, 18A:
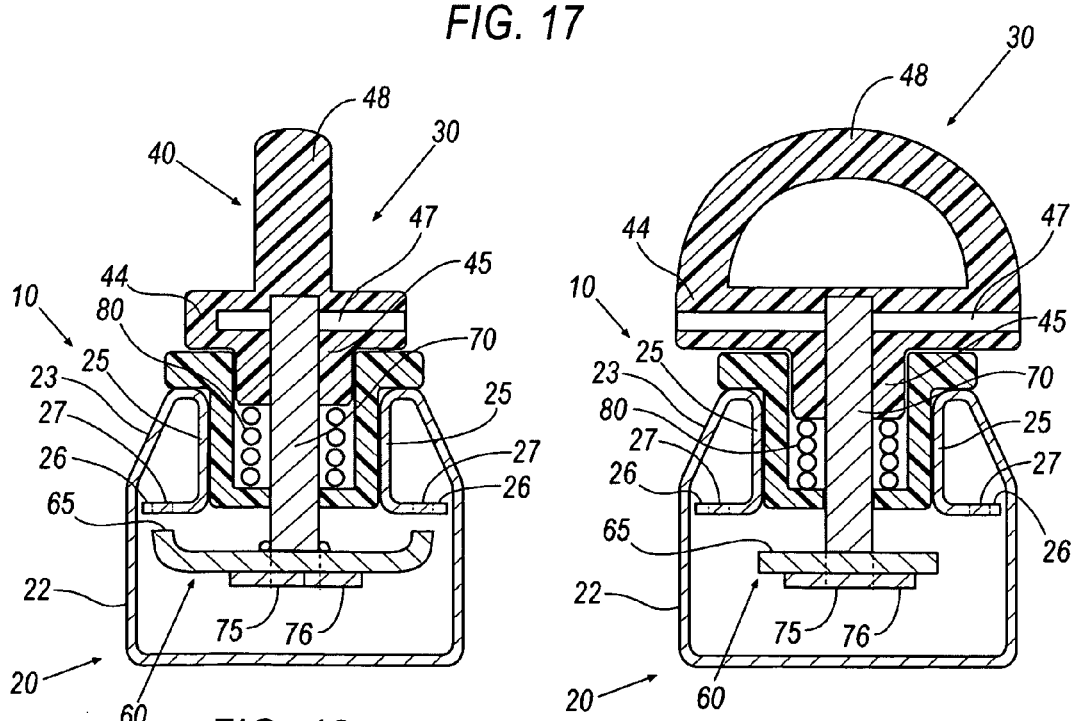
FIG. 18 is similar to that of FIG. 17 but showing a partially in section view the mechanism of FIG. 1 in an unlocked position.
FIG. 18A is a transverse section view of FIG. 18.

Referring now to FIGS. 1, 17 and 18, the operation of the adjustable tie-down mechanism 10 will now be described. Because the spring 80 is compressed within the sliding block 50, the spring 80 exerts a biasing force in an upward direction so that the tie-down loop 40 and the lock plate 60 of the adjustable tie-down mechanism 10 are biased in an upward direction. When the longitudinal axis L2 of the lock plate 60 is parallel to the longitudinal axis L of the rail 20, the end portions 65 of the lock plate 60 are received in the cavities 57 of the sliding block 50. In this position, the sliding block member 55 and the lock plate 60 can be inserted into the opening 28 of the rail 20 until the bottom surface 53 of the sliding block 50 engages the top surface 24 of the rail 20. Then, the user can slide the tie-down assembly 30 along the longitudinal axis L of the rail 20 until the tie-down assembly 30 is in a desirable location on the rail 20.

The user may then exert a biasing force in a downward direction opposite to the biasing force of the spring 80, exceeding the biasing force of the spring 80. Because the bottom surface 53 of the sliding block 50 engages the top surface 24 of the rail 20, the tie-down loop 40 and the lock plate 60 uniformly move in the downward direction until the end portions 65 of the lock plate 60 are no longer received in the cavities 57 of the sliding block 50. At this point, the adjustable tie-down mechanism 10 is in an unlocked position, as shown in FIG. 18. While in the unlocked position, the tie-down loop 40 and the lock plate 60 can be rotated approximately ninety (90) degrees until the longitudinal axis L2 of the lock plate 60 is substantially perpendicular to the longitudinal axis L of the rail 20.

Once the user has rotated the tie-down loop 40 and the lock plate 60, the user releases the downward biasing force. As a result, the biasing force exerted by the compressed spring 80 causes the tie-down loop 40 and the lock plate 60 to move upward so that the end portions 65 of the lock plate 60 can be received in the one or more slots 27 of the rail 20. If the end portions 65 are not properly aligned with the one or more slots 27 so that the end portions 65 are not received in the one or more slots 27, then the user can slide the tie-down assembly 30 along the longitudinal axis L of the rail 20 until the end portions 65 are properly received in the one or more slots 27 of the rail to positively secure the tie-down assembly 30 to the rail 20. The user can hear a "receiving" sound to audibly indicate that the end portions 65 are properly received in the one or more slots 27 of the rail 20. In addition, the user may visually ascertain whether the end portions 65 are properly received in the one or more slots 27 of the rail 20. In the described position, the user has placed the adjustable tie-down mechanism 10 in a locked position, as shown in FIG. 17. The tie-down loop 40 has sufficient height so that when the user pushes it in a downward direction making contact with the sliding block 50, the edges 65 of the lock plate 60 are disengaged from the slots 27 of the rail 20. The height, however, is not so great that it does not provide sufficient clamping force of the spring 80 between the lock plate 60 and the slots 27 of the rail 20. When an article (not shown) attached to the tie-down loop 40 is secured to an article carrier (not shown) on a vehicle and subjected to typical loading scenarios, it exerts additional forces in an upward direction on the tie-down loop 40. The additional forces provide additional securement between the lock plate 60 and the slots 27 of the rail 20 by pulling the tie-down loop 40 in the upward direction thereby causing the lock plate 60 to also be pulled in the upward direction.

One advantage of the adjustable tie-down mechanism 10 is that the amount of biasing force exerted by the spring 80 determines the amount of clamping force exerted by the lock plate 60 on the rail 20. However, the biasing force of the spring 80 can be easily adjusted by using well-known methods in the art, such as varying the diameter of the spring, the number of windings, or the like. Thus, the clamping force of the adjustable tie-down mechanism 10 can be adjusted independently of the strength of the user, unlike conventional tie-down systems.

Another advantage of the tie-down mechanism 10 is that the user may quickly and easily adjust the position of the adjustable tie-down mechanism 10 and the tie-down assembly 30 can be easily removed from the rail 20 without the use of tools, unlike conventional tie-down systems.

Figure 20:
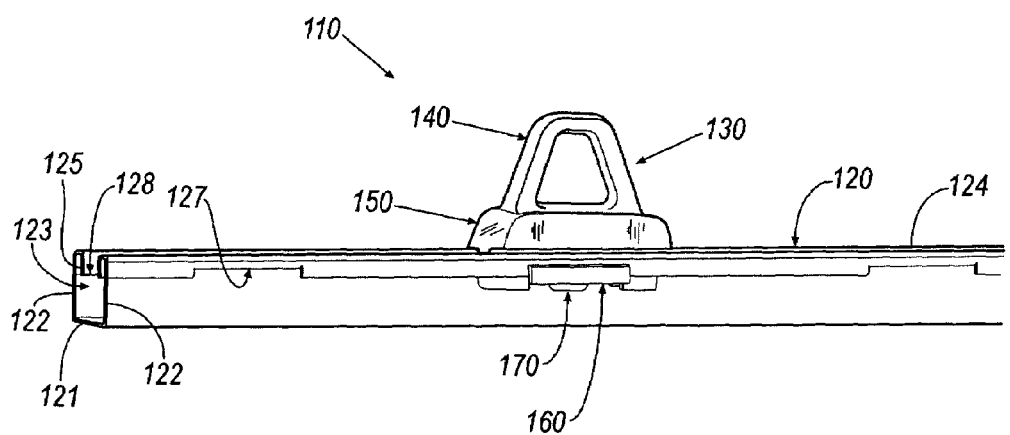
FIG. 20 is a perspective view partially in phantom, of a second embodiment of an adjustable tie-down mechanism according to the invention, showing the mechanism in a locked position.

Referring now to FIGS. 19 and 20, the method of placing the tie-down assembly 30 from an unsecured first orientation to a secured fourth orientation as shown in FIG. 17 will be described. The secured fourth orientation includes placing the tie-down assembly 30 on the top surface 24 of the rail 20. It is contemplated by the alternative embodiments that the tie-down assembly may be placed on the top surface 24 by inserting the tie-down assembly into an end (not shown) of the rail 20 in the first orientation. The tie-down loop 40 is pushed by the user in a downward direction from the first orientation to a second orientation. The second orientation includes the lock plate 60 disengaged from the rail 20 having the longitudinal axis of the lock plate 60 parallel to the longitudinal axis L of the rail 20. It is contemplated by alternative embodiments that the lock plate 60 does not rotate and therefore the longitudinal axis of the lock plate 60 will be perpendicular to the longitudinal axis L of the rail 20 when the tie-down assembly 30 is inserted into the rail 20. The user then rotates the tie-down loop 40 from the second orientation or generally ninety degrees with respect to the longitudinal axis L of the rail 20 to a third orientation. The third orientation is shown in FIG. 18 having the lock plate 60 below the slots 27 of the rail 20. The user may then release the tie-down loop from the third orientation allowing a biasing member shown as a spring 80 to bias the tie-down loop 40 to a secured forth orientation as shown in FIG. 17. The tie-down assembly is in a secured orientation when it either grips the flanges 26 of the side rail 20 or when each outwardly extending end portion 65 selectively engages a corresponding slot 27.

FIGS. 20–23 show another embodiment of an adjustable tie-down mechanism, shown generally at 110. As seen in FIG. 20, rail 120 includes a continuously extending channel 128 along its longitudinal axis terminating at an end 123. The channel 128 of the rail 120 is defined by a bottom surface 121 disposed between a pair of outer side walls 122. The top of the side walls 122 typically has inwardly extending legs 125 (flanges) that extend into the channel 128 disposed above the bottom surface 121. The rail 120 is preferably formed from steel, plastic, aluminum, polyamide resin, or the like and can be formed by stamping, molding, or similar operation. Slots 127 are located in the channel 128 providing a tie-down assembly 130 to be placed into a prescribed location. An end cap (not shown) is disposed at each end of rail 120 and may be permanently secured to the rail 120.

Figure 22:
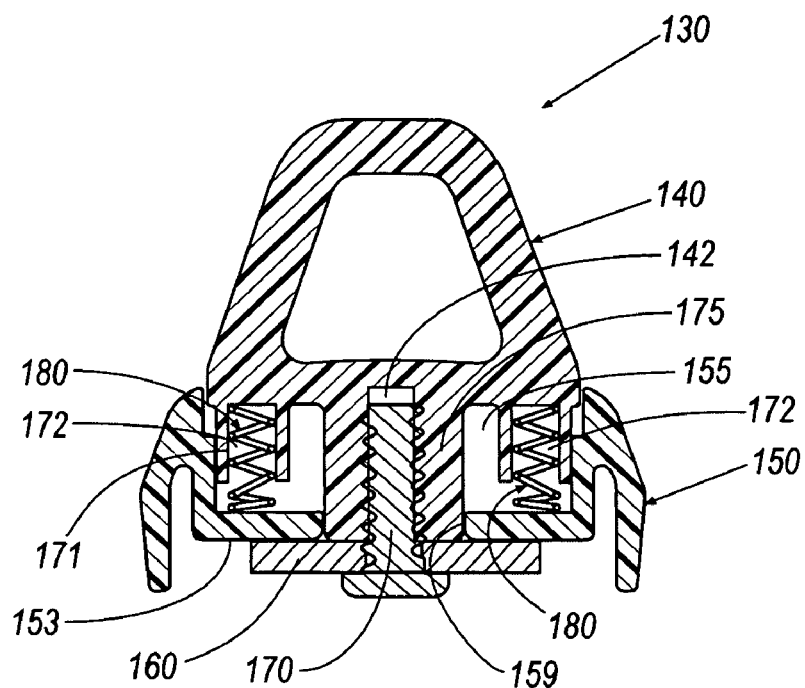
FIG. 22 is a longitudinal section of the assembly of FIGS. 20 and 21.
Figure 23:
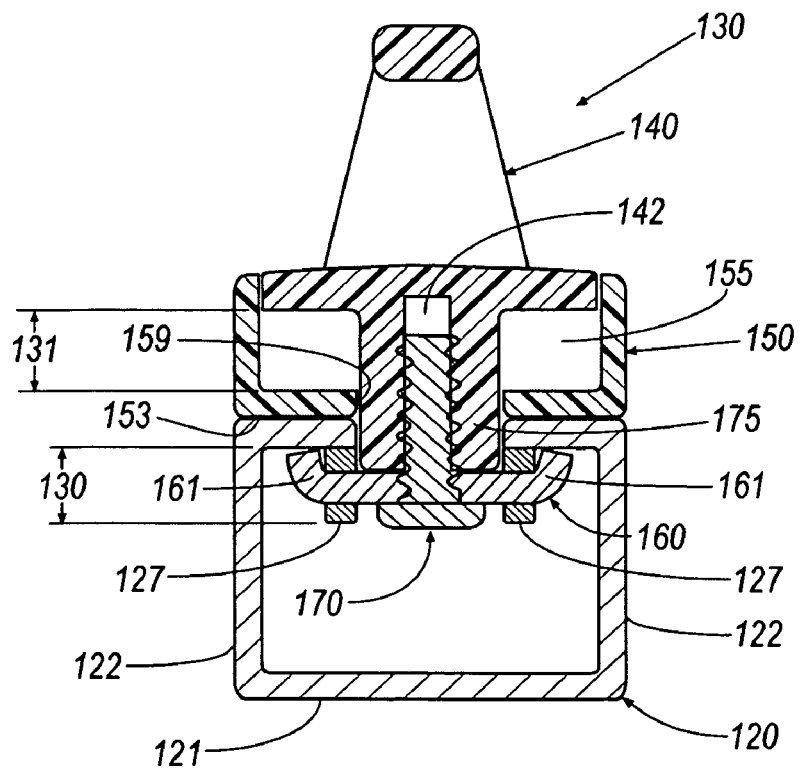
FIG. 23 is a view of a transverse section of the assembly of FIGS. 20, 21, and 22 and a rail with which it is associated.

The innovative tie-down mechanism 110 includes the tie-down assembly 130 having an attachment member or tie-down loop 140 disposed above a sliding member 150. The tie-down assembly 130 is inserted into the end 123 of the rail 120 and rests on a rail top surface 124 of the rail 120 as shown in FIG. 20. As shown in FIGS. 22 and 23, the tie-down assembly 130 is in a locked orientation and secured to the sliding member 150 by a pin 170 and a lock plate 160. The pin 170 is disposed in a tie-down loop cavity 142 and secured to the lock plate 160 by a securement means including: welding, gluing, screwing, or the like. The lock plate 160 may be rigidly secured to the pin 170. In an alternative embodiment, the lock plate 160 and the pin 170 may be a single component.

Figure 21:
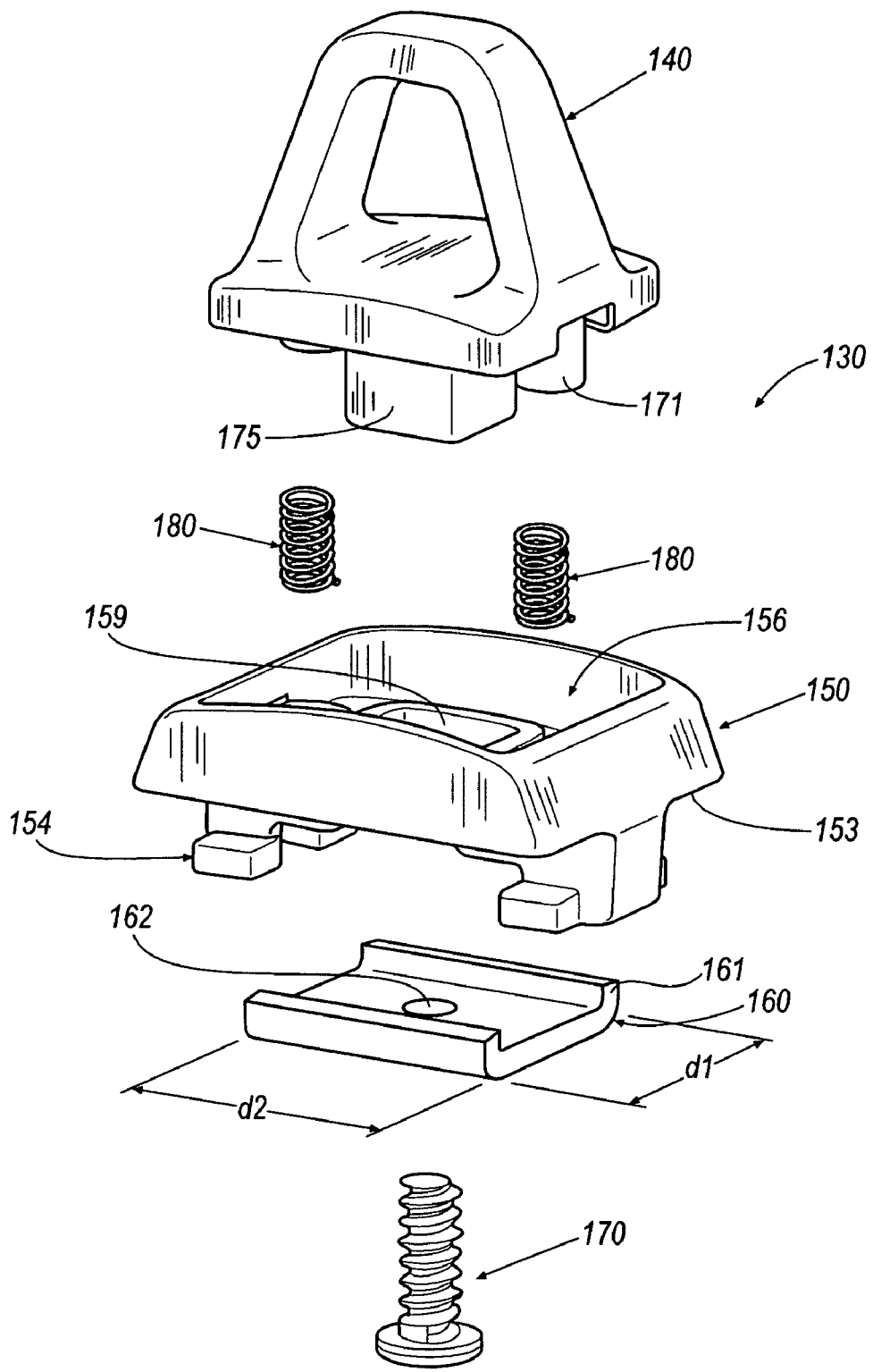
FIG. 21 is an exploded perspective view of a tie-down assembly of the mechanism of FIG. 20 showing the various elements of the assembly.

Referring to FIG. 21, the lock plate 160 includes a first dimension d1 and a second dimension d2. The second dimension d2 is greater than the first dimension d1. In the indicated embodiment, the lock plate 160 is generally rectangular having the first dimension d1 being the short edge and the second dimension d2 being the long edge. The lock plate 160 also has two optional extending ears 161 to help facilitate the selective gripping of the legs 125 of the rail 120 when the tie-down assembly 130 is in the secured orientation. The lock plate 160 is adapted to fit the slots 127 of the rail 120 as shown in FIG. 23. The slots 127 may be used to arrest the lock plate 160 in a specific location along the longitudinal axis of rail 120.

The tie-down assembly 130 is loaded at the end 123 of the rail 120 by applying force in a downward direction on the tie-down loop 140 moving the lock plate away from the sliding member 150 allowing insertion into the channel 128 of the rail 120.

Further referring to FIG. 21, two spring members 180 are shown. Each spring member 180 is disposed proximate a guide post 171 biasing the tie-down loop 140 in an upward direction away from sliding member 150. Each guide post 171 is disposed proximate the tie-down loop post 175. It is contemplated by this embodiment that one spring member 180 may be used and disposed around the tie-down loop post 175. Two spring members 180 may be used when a larger single spring member 180 does not fit into the sliding member 150. Each spring member 180 is located between the tie-down loop 140 and sliding member 150. It is also contemplated by this embodiment that corresponding passages (not shown) are defined proximate the sliding member bottom surface 153 within the sliding member 150 that correspond in shape to the guide post 171.

One or more spring members 180 secure the tie-down assembly 130 into position by biasing the lock plate 160 in an upward direction, forcing the lock plate 160 to grip the legs 125 of the rail 120 when the tie-down loop 140 is released. The lock plate 160 may also be arrested into position by mating each ear 161 with the corresponding slots 127 of the rail 120 at a desired location along the longitudinal axis of the rail 120.

As best shown in FIG. 21, sliding member 150 is shown tapered in cross-section having a sliding member pocket 156 providing an unimpeded up and down movement of the tie-down loop 140 as the tie-down assembly 130 is moved from the secured orientation to an unsecured orientation. Sliding member 150 is inserted into a rail 120 at the end 123 so that a sliding member bottom surface 153 rests on the rail top surface 124. The tie-down assembly 130 includes a flange 154 of the sliding member 150 that assists the lock plate 160 in arresting the tie-down assembly 130 to the rail 120 by prohibiting the tie-down assembly 130 from being removed from the top of the rail 120. The sliding member 150 defines a sliding member passage 159 that is generally the same shape as a tie-down loop post 175. The embodiment contemplates that the tie-down loop post 175 and the sliding member passage 159 define a rectangular, square, oval, or circular section.

Now referring to FIG. 22 and FIG. 23, the tie-down assembly 130 is shown in the locked orientation. A first distance 131 is greater than a second distance 130 so that lock plate 160 can be moved in the downward direction by a user a distance allowing the lock plate 160 to disengage the rail 120 and allowing the tie-down assembly 130 to be repositioned along the rail 120. The tie-down loop 140 has sufficient height so that when the user pushes it in a downward direction making contact with the sliding member 150, the extending ears 161 of the lock plate 160 are disengaged from the slots 127 of the rail 120. The height, however, is not so great that it does not provide sufficient clamping force of the spring 180 between the lock plate 160 and the slots 127 of the rail 120 as discussed above. When the tie-down loop 140 is moved in the downward direction into a sliding member cavity 155, the lock plate 160 and pin 170 move generally simultaneously in the same direction and distance. The tie-down assembly 130 is disengaged from the rail 120 when the lock plate 160 is moved in the downward direction so that the extending ears 161 are below the legs 125 of the rail 120, placing the tie-down assembly in an unlocked orientation and ready for repositioning along the rail 120. The tie-down assembly 130 may be repositioned along the rail 120 by moving the sliding block 150 along the rail top surface 124 of the rail 120, which is in direct contact with a sliding member bottom surface 153 to a desired location. The tie-down assembly 130 is in a locked orientation when the lock plate 160 engages a corresponding pair of slots 127 in the rail 120. Alternatively, if the rail 120 does not have slots 127, the tie-down assembly 130 is in a locked position when the lock plate 160 is biased in the upward direction by the spring member 180 gripping the inwardly extending legs 125 of the rail 120.

Figure 24:
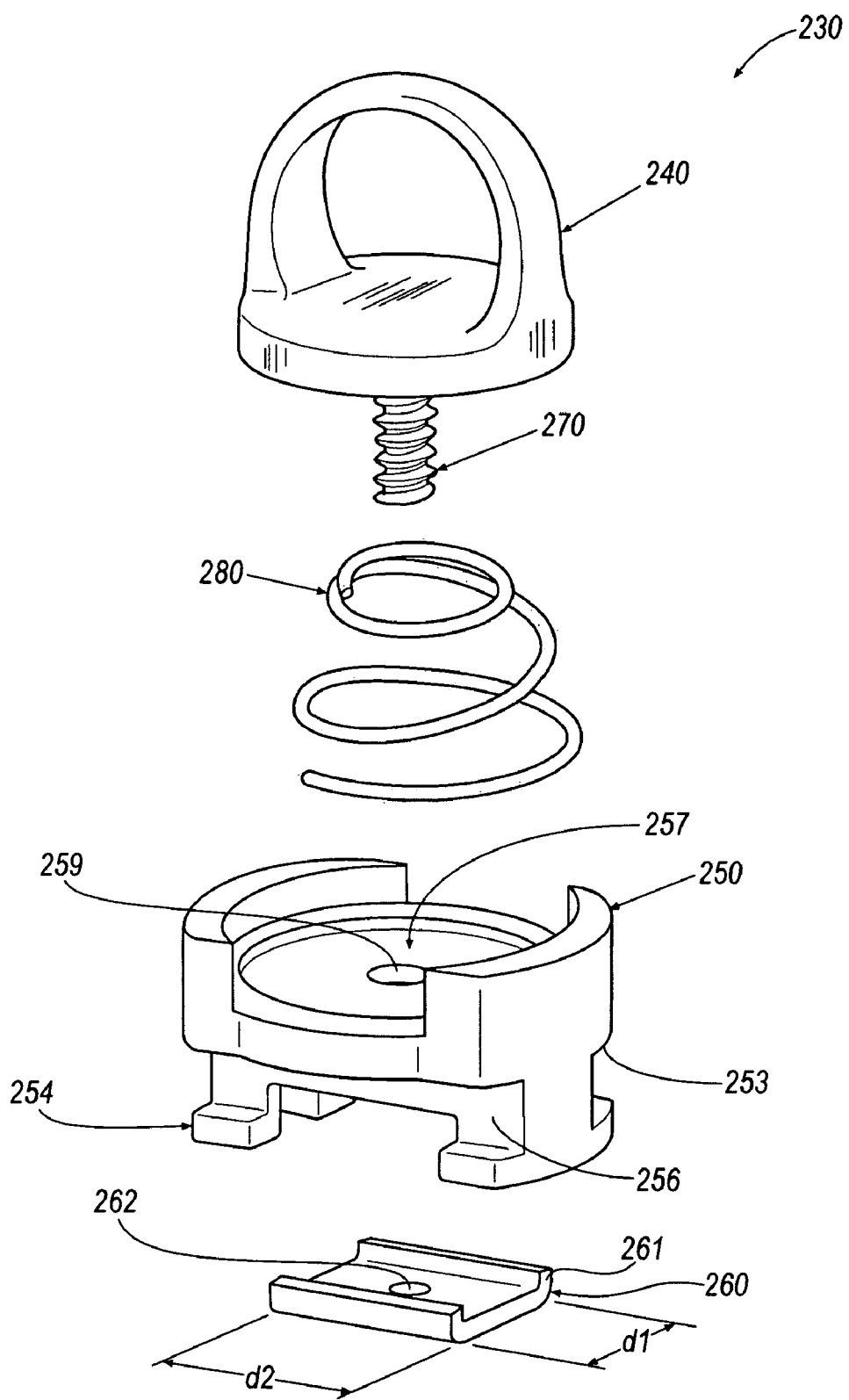
FIG. 24 is an exploded perspective view of a third embodiment of an adjustable tie-down mechanism according to the invention.
Figure 25:
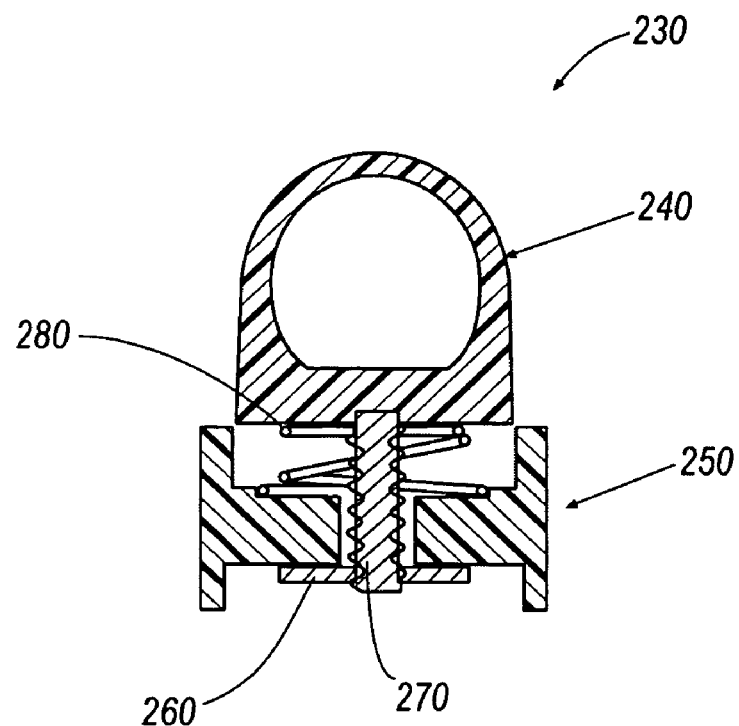
FIG. 25 is a longitudinal section of the mechanism of FIG. 24.
Figure 26:
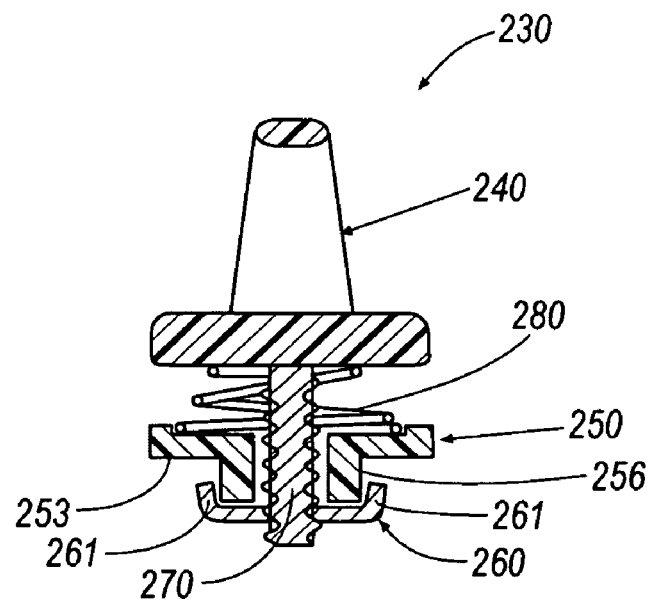
FIG. 26 is a transverse section of the mechanism of FIGS. 24 and 25.

FIGS. 24–26 illustrate another embodiment of an adjustable tie-down assembly, shown generally at 230, according to the invention. The tie-down assembly 230 is loaded at the rail end 123, as shown in FIG. 20, resting on the top surface 124 of rail 120 in the secured position.

The innovative tie-down assembly 230 includes an attachment member or tie-down loop 240 that is secured to a sliding member 250 by a pin 270 and a lock plate 260. The pin 270 is secured to the tie-down loop 240, but may also be formed together with the tie-down loop 240 as one piece. The lock plate 260 includes threads that allow it to move in an upward and a downward direction along the pin 270 based on the rotation of the tie-down loop 240. The sliding member 250 includes side walls 256 adapted to engage the channel 128 of the rail 120 preventing the tie-down assembly 230 from twisting in the rail 120 as discussed in the first embodiment above. The sliding member 250 rides along the top surface 124 of the rail 120. FIGS. 25 and 26 show a cross-sectional view of the tie-down assembly 230 in a secured position. The illustrated embodiment further provides the user the ability to tighten the tie-down assembly by turning the tie-down loop in a clockwise direction. The clockwise turning of the tie-down loop 240 moves the lock plate 260 in an upward direction further tightening the lockplate 260 against the inwardly extending legs 125 of rail 120.

The sub-assembly of the tie-down loop 240 and sliding member 250 is secured to the rail 120 by the lock plate 260 and the pin 270. The tie-down loop 240 is rigidly secured to the pin 270. The spring member 280 is disposed between the tie-down loop 230 and the sliding member 250 around the pin 270 biasing the tie-down loop 240 in an upward direction away from the sliding member 250. The spring member 280 is disposed between the tie-down loop 240 and sliding member 250.

The lock plate is biased in an upward direction by the spring member 280 until the tie-down assembly 230 is secured to the rail 120. The spring member 280 biases the tie-down loop 240 in an upward direction moving the pin 270 and lock plate 260 in generally the same direction and distance. The tie-down assembly 230 may be further tightened against the rail by selectively turning the tie-down loop 230 in a securing direction further providing a clamping force between the lock plate 260 and the rail 120.

The lock plate 260 includes a first dimension d1 and a second dimension d2. The second dimension d2 is greater than the first dimension d1. In the indicated embodiment, lock plate 260 is generally rectangular having the first dimension d1 being the short edge and the second dimension d2 being the long edge. It is contemplated by this invention that the lock plate 260 may have the first dimension d1 and second dimension d2 equal in length. Lock plate 260 also has two optional extending ears 261 to help facilitate the selective gripping of the legs 125 on the rail 120 when the tie-down assembly 230 is in the secured orientation as shown in FIGS. 25 and 26. Lock plate 260 is also adapted to fit the slots 127 of the rail 120. The slots 127 may be used to arrest the lock plate 260 in a specific location along the longitudinal length of the rail 120.

As shown in FIG. 24, sliding member 250 is shown generally circular including a sliding member pocket 259 that provides unimpeded up and down movement of the tie-down loop 240 as the tie-down assembly 230 is secured to the rail 120 as shown in FIG. 26. Sliding member 250 is inserted into the rail 120 at the rail end 123, as shown in FIG. 20, so that a sliding member bottom surface 253 sits on the rail top surface 124. A securing member 254 of the sliding member 250 arrests the lock plate 260 into the channel 122 of the rail 120 by preventing the removal of the tie-down assembly 230 from the top surface 124 of the rail 120. The sliding member 250 includes a sliding member passage 259 that provides unimpeded movement of the pin 270 in an upward and downward direction.

The tie-down assembly 230 is loaded at the rail end 123 of the rail 120 as shown in FIG. 20 by applying force in a downward direction on the tie-down loop 240 and inserting the tie-down assembly 230 into the rail end 123. The spring member 280 secures the tie-down assembly 230 into position by biasing the lock plate 260, the pin 270, and the tie-down loop in an upward direction forcing the lock plate 260 to grip the inwardly extending legs 125 of the rail 120 when the tie-down loop 240 is released. The tie-down assembly 230 is in a locked orientation when the tie-down loop 140 is turned in a clockwise direction allowing the lock plate 260 to further tighten against the legs 125 of the rail 120. The lock plate 260 may also be secured into position by mating with the slots 127 of the rail 120 and further locked by turning the tie-down loop 240 in the clockwise direction until the lock plate 260 grips either the rail 120 with no slots 127 or the slots 127.

When tie-down loop 240 is pushed in a downward direction into a sliding member cavity 257, the lock plate 260 and pin 270 move generally simultaneously in the same direction and distance once the tie-down loop 240 has been turned in a counterclockwise direction allowing the lock plate 260 to be moved in a downward direction. The tie-down assembly 230 is disengaged and ready to be repositioned along the rail 120 from the rail 120 when the lock plate 260 is biased in the downward direction so that the ears 261 are below the legs 125 of the rail 120. The tie-down assembly 230 may be repositioned along the rail 120 by moving the sliding block 250 along the rail top surface 124 of the rail 120 that is in direct contact with a sliding member bottom surface 253 to the desired location.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. An adjustable tie-down assembly comprising:
   a pin having a first end and a second end;
   a lock plate disposed proximate said second end;
   a sliding block having an upper surface and a lower surface, said sliding block being adapted to receive said pin between said upper surface and said lower surface;
   an attachment member disposed proximate said first end;
   at least one spring member disposed between said lock plate and said attachment member, said spring member being adapted to bias said attachment member in an upward first direction away from said sliding block, said spring member biasing said lock plate in said first direction; and
   whereby said attachment member moving in an upward and a downward direction independently of said sliding block;
   whereby selective rotation of said attachment member moves said lock plate between said upward first direction and a downward second direction.

2. The tie-down assembly according to claim 1, wherein said tie-down assembly is placed in an unsecured orientation by moving said attachment member in a downward second direction, said second direction being opposite to said first direction.

3. The tie-down assembly according to claim 1, including means for securing said tie-down assembly to said rail.

4. The tie-down assembly according to claim 3, wherein said means includes said pin having threads.

5. The tie-down assembly according to claim 1, wherein said spring member is disposed within said sliding block.

6. The tie-down assembly according to claim 1, wherein said spring member is a coil spring disposed around said pin.

7. The tie-down assembly according to claim 1, wherein said pin includes an anti-rotation element with respect to said attachment member.

8. The tie-down assembly according to claim 7, wherein said anti-rotation element of said pin includes a tab adapted to be partially received within said lock plate.

9. The tie-down assembly according to claim 1, wherein said tie-down assembly is adapted to selectively grip a rail, said rail includes a pair of opposed flanges forming a channel therebetween.

10. The tie-down assembly according to claim 9, wherein said sliding block is adapted to be inserted into said rail from an upper surface, said attachment member being adapted to be rotated ninety degrees with respect to said sliding block so that said lock plate is generally parallel to said channel of said rail when removing said tie-down assembly from said rail.

11. A tie-down mechanism comprising:
   a rail including a pair of opposing flanges forming a channel therebetween;
   a tie-down assembly including
      a pin having a first end and a second end,
      a lock plate disposed proximate said second end,
      an attachment member disposed proximate said first end, and
      a sliding block being partially received within said channel and being disposed between said lock plate and said tie-down loop, said lock plate being in operational communication with said attachment member by said pin passing through said sliding block, at least one spring member disposed between said lock plate and said attachment member, said spring member biasing said attachment member in a first direction away from said sliding block said lock plate being biased in said first direction by said spring member; and whereby said attachment member moving in an upward and a downward direction independently of said sliding block;

whereby selective rotation of said attachment member moves said lock plate between said upward first direction and a downward second direction.

12. The tic-down mechanism according to claim 11, wherein said spring member is disposed within said sliding block.

13. The tie-down mechanism according to claim 11, wherein said spring member is a coil spring disposed around said pin.

14. The tie-down mechanism according to claim 11, wherein said lock plate includes an anti-rotation element for preventing rotation of said lock plate with respect to said attachment member.

15. The tie-down mechanism according to claim 14, wherein said anti-rotation element includes a tab adapted to be partially received within said lock plate.

16. The tie-down mechanism according to claim 11, wherein said lock plate is generally transverse with respect to a channel length of said channel when said tie-down mechanism is in a secured orientation.

17. The tie-down mechanism according to claim 11, wherein said attachment member and said lock plate are adapted to rotate approximately ninety degrees with respect to said sliding block so that said lock plate is generally parallel to said channel of said rail when removing said tie-down assembly from said rail.

18. An adjustable tie-down assembly comprising:

a pin having a first end and a second end, said pin having threads;

a lock plate disposed proximate said second end, said lock plate being in threaded mechanical communication with said pin;

a sliding block having an upper surface and a lower surface, said sliding block being adapted to receive said pin between said upper surface and said lower surface;

an attachment member disposed proximate said first end, said attachment member moves in an upward and a downward direction independently of said sliding block;

at least one spring member disposed between said lock plate and said attachment member, said spring member being adapted to bias said attachment member in an upward first direction away from said sliding block, said spring member biasing said lock plate in said first direction;

whereby, in a secured orientation, selective rotation of said attachment member moves said lock plate between said upward first direction and a downward second direction; and whereby selectively moving said attachment member in said downward second direction permits rotation of said lock plate when said attachment member is rotated; and wherein said pin includes a stop mechanism proximate said second end for preventing said lock plate from being disconnected.

19. The adjustable tie-down assembly of claim 18, wherein said stop mechanism includes a weld.

* * * * *